US008660611B2

(12) United States Patent
Sagae et al.

(10) Patent No.: US 8,660,611 B2
(45) Date of Patent: Feb. 25, 2014

(54) BASE STATION APPARATUS AND METHOD

(75) Inventors: Yuta Sagae, Kawasaki (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 406 days.

(21) Appl. No.: 12/993,270

(22) PCT Filed: Apr. 30, 2009

(86) PCT No.: PCT/JP2009/058509
§ 371 (c)(1),
(2), (4) Date: Feb. 2, 2011

(87) PCT Pub. No.: WO2009/142104
PCT Pub. Date: Nov. 26, 2009

(65) Prior Publication Data
US 2011/0124374 A1       May 26, 2011

(30) Foreign Application Priority Data

May 19, 2008   (JP) .................................. 2008-131375

(51) Int. Cl.
*H04B 1/38*    (2006.01)
*H04M 3/00*    (2006.01)
*H04W 4/00*    (2009.01)
*H04B 7/00*    (2006.01)

(52) U.S. Cl.
USPC ........... 455/561; 370/310; 370/328; 370/329; 455/422.1; 455/434; 455/515

(58) Field of Classification Search
USPC .................. 455/561–562.1, 422.1, 434, 515; 370/310–310.2, 328, 329, 338
See application file for complete search history.

(56) References Cited

U.S. PATENT DOCUMENTS 5,625,876 A *   4/1997   Gilhousen et al. ............. 370/331
6,366,778 B1 *   4/2002   Bender et al. ................. 455/442
8,280,443 B2 *  10/2012   Tao et al. .................... 455/562.1

(Continued)

FOREIGN PATENT DOCUMENTS

JP          10 23519         1/1998
JP        2002 164843        6/2002

(Continued)

OTHER PUBLICATIONS

Perez-Romero, J., et al., "A Novel On-Demand Cognitive Pilot Channel enabling Dynamic Spectrum Allocation," IEEE, pp. 46-54, (Apr. 17, 2007).

(Continued)

*Primary Examiner* — Matthew Sams
(74) *Attorney, Agent, or Firm* — Oblon, Spivak, McClelland, Maier & Neustadt, L.L.P.

(57)      ABSTRACT

A base station apparatus includes a distribution unit configured to distribute control information on a per-segmented area basis, the segmented area resulting from segmentation of a coverage area into multiple segmented areas, a storage unit configured to store the control information corresponding to the segmented areas, and a determination unit configured to determine a distribution method for each of the segmented areas. The determination unit determines one of a distribution method of periodically distributing the control information corresponding to the segmented areas in the coverage area in charge of the base station apparatus and a distribution method of distributing the control information corresponding to a segmented area requested by a terminal apparatus in response to the requesting by the terminal apparatus.

6 Claims, 8 Drawing Sheets

(56) References Cited

U.S. PATENT DOCUMENTS

| | | |
|---|---|---|
| 2004/0152453 A1 | 8/2004 | Hayashi |
| 2006/0030342 A1 | 2/2006 | Hwang et al. |
| 2007/0207838 A1* | 9/2007 | Kuwahara et al. .......... 455/562.1 |
| 2007/0223402 A1* | 9/2007 | Waxman ....................... 370/277 |
| 2008/0026795 A1 | 1/2008 | Fujii |
| 2010/0027466 A1* | 2/2010 | Mustapha .................... 370/328 |

FOREIGN PATENT DOCUMENTS

| | | |
|---|---|---|
| JP | 2004 221758 | 8/2004 |
| JP | 2007 533246 | 11/2007 |
| JP | 2008 35126 | 2/2008 |
| WO | WO 2008/044664 A1 | 4/2008 |

OTHER PUBLICATIONS

International Search Report issued Jun. 23, 2009 in PCT/JP09/058509 filed Apr. 30, 2009.

Extended European Search Report issued Sep. 11, 2012 in Patent Application No. 09750466.6.

* cited by examiner

BASE STATION APPARATUS AND METHOD

TECHNICAL FIELD

The present invention relates to a base station apparatus and a method for distributing a common control channel.

BACKGROUND ART

For radio systems operating in various areas, a cognitive pilot channel (CPC) is proposed for distributing information regarding frequencies, radio schemes and so on in use within the areas. Applying the cognitive pilot channel can make it unnecessary for a terminal apparatus to scan fundamental parameter information on a connectable radio system. Also, if the cognitive pilot channel is applied, only the above control information has to be changed to adjust some parameters for the radio system. In addition, the cognitive pilot channel is applicable without modifying the terminal apparatus itself.

Adoption of this technology can realize price reduction of the terminal apparatus and respond to modification of radio system parameters. Also, it can be expected to improve frequency utilization efficiency by responding to the modification of radio system parameters. In the present technology, a coverage area of a base station apparatus is segmented into multiple areas. The segmented areas may be referred to as meshes. A control signal is distributed to the coverage area of the base station apparatus. The base station apparatus transmits utilization methods of radio resources such as the fundamental parameter information for the radio system multiple times on a per-mesh basis. The same information may be transmitted. FIG. 1 illustrates downlink broadcast cognitive pilot channels. In the example illustrated in FIG. 1, the coverage area of the base station apparatus is segmented into Nm meshes (where Nm is an integer greater than 1). The control information is periodically distributed to each mesh over time. Upon detecting the cognitive pilot channel, a terminal apparatus waits for distribution of the control information corresponding to a resident mesh of the terminal apparatus. The total distribution time (Tm, B) of the control information in the different meshes depends on a bit rate of distributing the downlink broadcast cognitive pilot channels. (Tm, B) includes multiple time slots indicated in Ts. In this manner, the terminal apparatuses can take synchronization with all information sequences distributed in the channels.

Also, there are two distribution methods to distribute the control signal, a broadcast type distribution method and an on-demand type distribution method. In the broadcast type distribution method, a base station apparatus periodically distributes the control information to meshes in charge. In the on-demand type distribution method, in response to a distribution request from a terminal apparatus, a base station apparatus distributes the control information to a mesh of the requesting terminal apparatus.

RELATED ART DOCUMENT

Non-Patent Document

Non-patent document 1: J. Perez-Romero, et al., "A novel On-Demand Cognitive Pilot Channel enabling Dynamic Spectrum Allocation", IEEE Dyspan 2007.

SUMMARY OF INVENTION

Problem to be Solved by the Invention

The base station apparatuses described in the above Background Art may have some problems as follows. For example, the broadcast type distribution method is effective in areas having a small number of meshes and a large number of users. On the other hand, the broadcast type distribution method requires a wider band depending on the number of meshes. The more the meshes are, the more amounts of control information has to be distributed, and accordingly a wider band must be reserved. If such a wider band is not available, a distribution interval of the control information in the same mesh would be longer, which may lead to increase in delay in reception of the control information.

In contrast, the on-demand type distribution method is effective in the case where there are a large number of meshes and a small number of terminals requiring requests of the control signal. In the on-demand type distribution method, on the other hand, the number of requests increases depending on the increasing number of terminals in a distribution area. As a result, depending on the requests, the on-demand type distribution method increases the number of distribution times of the control signal and reduces a band available for transmitting data information.

Particularly, in the case where a radio communication system may operate indoors and outdoors and the same base station apparatus may be used to distribute the control signal in the both environments, the optimum distribution method may differ depending the environments.

Thus, the present invention addresses the above-mentioned problems, and one object of the present invention is to provide a base station apparatus and a method that can change the distribution method depending on the environment.

Means for Solving the Problem

In order to address the problems, the present base station apparatus includes a distribution unit configured to distribute control information on a per-segmented area basis, the segmented area resulting from segmentation of a coverage area into multiple segmented areas, a storage unit configured to store the control information corresponding to the segmented areas, and a determination unit configured to determine a distribution method for each of the segmented areas, wherein the determination unit determines one of a distribution method of periodically distributing the control information corresponding to the segmented areas in the coverage area in charge of the base station apparatus and a distribution method of distributing the control information corresponding to a segmented area requested by a terminal apparatus in response to the requesting by the terminal apparatus.

The present method in a base station apparatus for distributing control information on a per-segmented area basis wherein the segmented area results from segmentation of a coverage area into multiple segmented areas includes the steps of determining a distribution method for each of the segmented areas and distributing the control information on the per-segmented area basis in accordance with the distribution method determined at the determining step, wherein the determining step comprises determining one of a distribution method of periodically distributing the control information corresponding to the segmented areas in the coverage area in charge of the base station apparatus and a distribution method of distributing the control information corresponding to a segmented area requested by a terminal apparatus in response to the requesting by the terminal apparatus.

Advantage of the Invention

According to the embodiments, of the present invention, it is possible to change the distribution method of the control information depending on the environment.

DETAILED DESCRIPTION OF EMBODIMENTS

Embodiments of the present invention are described below with reference to the drawings. Throughout all the drawings illustrating the embodiments, the same reference symbols are designated for elements and components having the same functions, and descriptions thereof are not repeated.

First Embodiment

Figure 1:
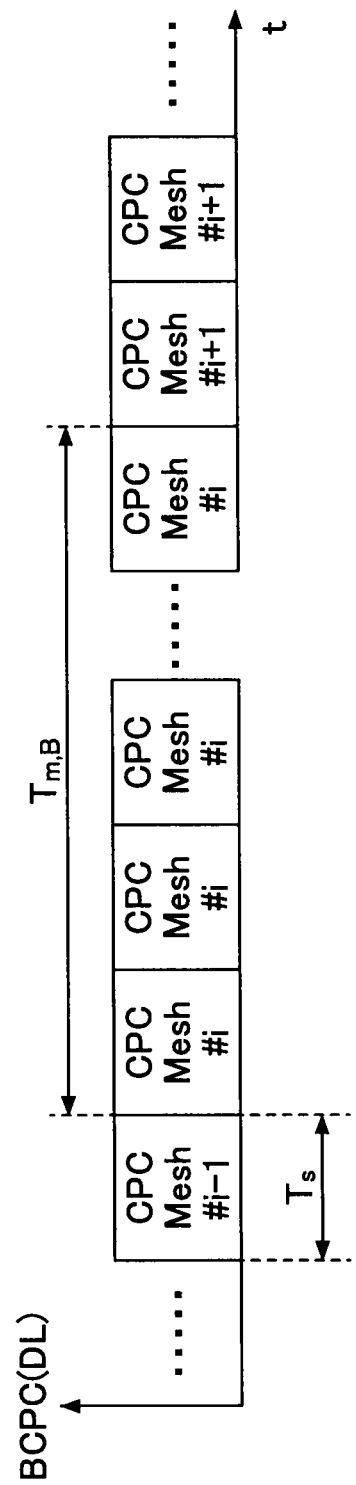
FIG. 1 is a schematic view illustrating exemplary distribution of cognitive pilot channels.
Figure 2:
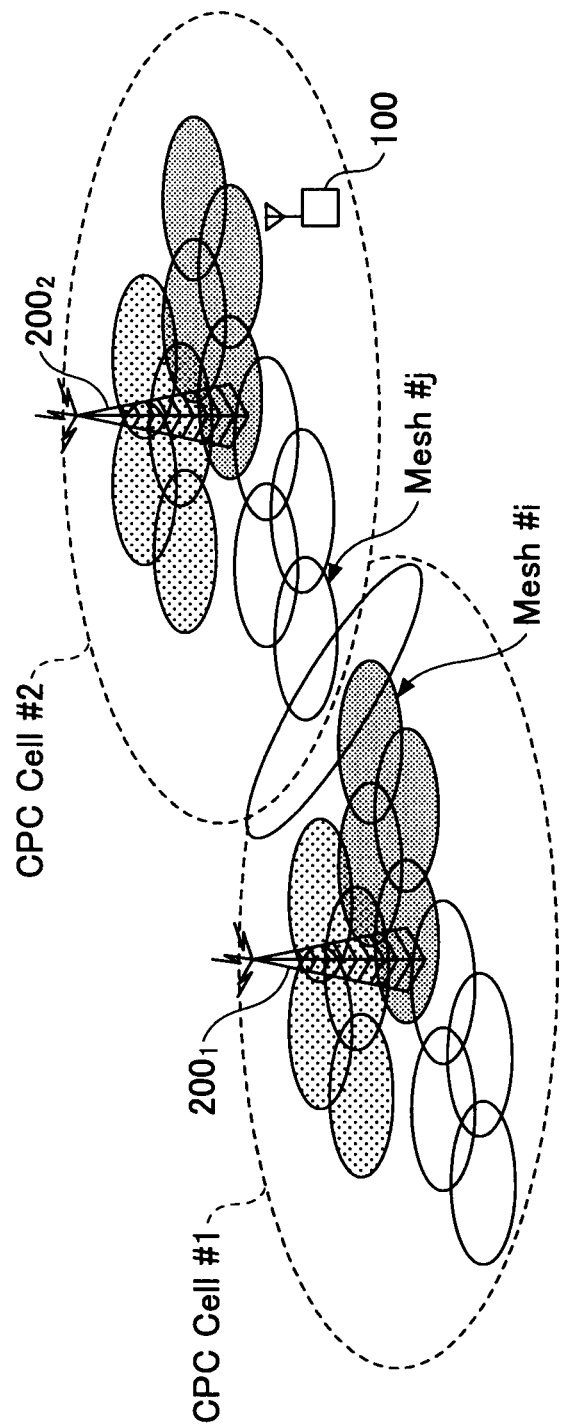
FIG. 2 is a schematic view illustrating a communication system according to one embodiment.

A communication system according to this embodiment is described with reference to FIG. 2. The communication system according to this embodiment includes base station apparatuses 200 ($200_1$, $200_2$). Also, the communication system according to this embodiment includes a radio control apparatus. In addition, the communication system according to this embodiment includes a terminal apparatus 100. Furthermore, the functionality of the radio control apparatus may be included in the base station apparatuses. Although the two base station apparatuses are illustrated in FIG. 2, three or more base station apparatuses may be provided. Also, although the single terminal apparatus is illustrated in FIG. 2, two or more terminal apparatuses may be provided.

Each of the base station apparatuses 200 covers a cognitive pilot channel cell (referred to as a CPC cell hereinafter) as an area (domain) to distribute control information. Each CPC cell includes multiple meshes. The meshes are areas resulting from segmentation of the coverage area of the base station apparatus. In the example illustrated in FIG. 2, Mesh #i in CPC Cell #1 is adjacent to Mesh #j in CPC Cell #2. Also, in the example illustrated in FIG. 2, similarly hatched meshes are operated under the same communication system or the same fundamental radio parameters. Here, the cognitive pilot channel corresponds to control information for each mesh. For example, the control information may include control information for the communication system operating in that mesh. In one transmission method, the radio control information may be transmitted in the cognitive pilot channel through radio waves. In another transmission method, the radio control information may be transmitted in the cognitive pilot channel through wires such as optical fibers.

Figure 3:
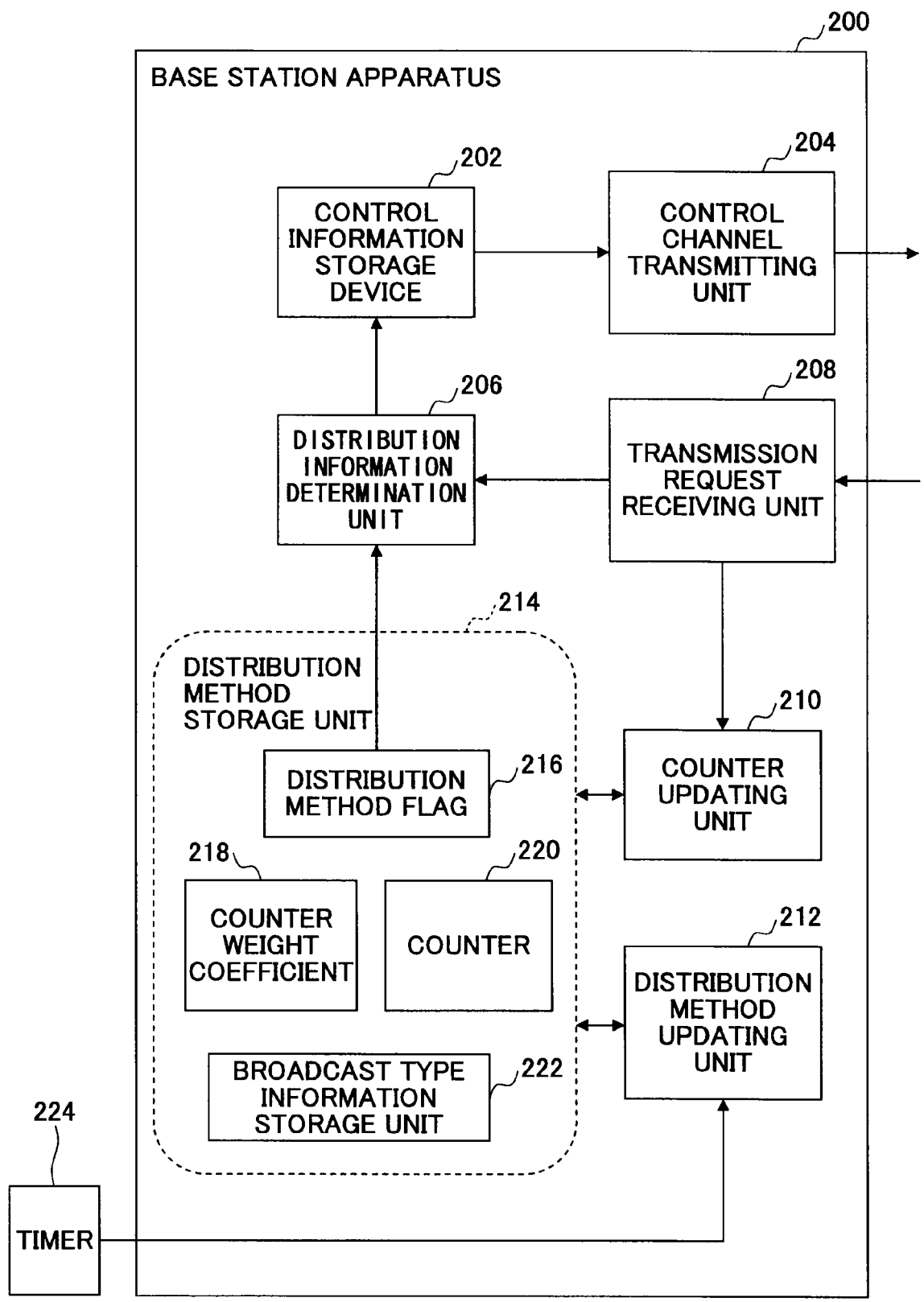
FIG. 3 is a partial block diagram illustrating a base station apparatus according to one embodiment.

The base station apparatus 200 according to this embodiment is described with reference to FIG. 3.

The base station apparatus 200 according to this embodiment includes a control information storage device 202. The control information storage device 202 stores control information required for communication through all radio systems operating in a distribution area of the base station apparatus 200. The control information may include information indicative of radio schemes. Also, the control information may include information indicative of frequencies and bandwidths used in the operating radio communication systems. The control information storage device 202 supplies the control information to a control channel transmitting unit 204.

The base station apparatus 200 includes the control channel transmitting unit 204. The control channel transmitting unit 204 modulates and transmits the control information supplied from the control information storage device 202.

The base station apparatus 200 according to this embodiment includes a distribution information determination unit 206. The distribution information determination unit 206 determines which control information is to be distributed. For example, the distribution information determination unit 206 may determine which control information is to be distributed for each mesh.

The base station apparatus 200 according to this embodiment includes a transmission request receiving unit 208. The transmission request receiving unit 208 receives a control information request signal transmitted from the terminal apparatus 100. When the terminal apparatus requests the control information associated with a needed mesh, the terminal apparatus transmits the control information request signal.

The base station apparatus 200 according to this embodiment includes a counter updating unit 210. Upon receiving a transmission request, the counter updating unit 210 updates the number of request times. For example, in response to receipt of the control information request signal from the terminal apparatus 100, the counter updating unit 210 updates the number of reception times. Details are described below.

The base station apparatus 200 according to this embodiment includes a distribution method updating unit 212. The distribution method updating method 212 may change distribution methods based on the number of request times. Also, the distribution method updating unit 212 may change the distribution methods based on distribution method update time. The distribution method update time may be determined in advance. The distribution methods may include the broadcast type distribution method and the on-demand type distribution method as stated above. In the broadcast type distribution method, a base station apparatus periodically distributes control information to meshes within an area in charge. In the on-demand type distribution method, in response to a distribution request from a terminal apparatus, the base station apparatus distributes the control information to a mesh requested by the terminal apparatus.

The base station apparatus 200 according to this embodiment includes a distribution method storage unit 214. The distribution method storage unit 214 stores information required to determine the distribution methods.

The distribution method storage unit 214 includes a distribution method flag 216. Flag information indicative of a current distribution method is held in the distribution method flag 216. For example, the distribution method flag 216 may store the flag information indicative of different distribution methods for different meshes.

The distribution method storage unit 214 includes a counter weight coefficient 218. The counter weight coefficient 218 stores weight coefficients to add to counters upon requests from the terminal apparatus 100. For example, the counterweight coefficient 218 may store the weight coefficients corresponding to different meshes.

The distribution method storage unit 214 includes a counter 220. The counter 220 stores the number of request times determined based on the number of previous request times. For example, the counter 220 may store counter values corresponding to different meshes.

The distribution method storage unit 214 includes a broadcast type information storage unit 222. The broadcast type information storage unit 222 stores the order of meshes for distributing control information in the case where the broadcast type distribution method is adopted. For example, the distribution method storage unit 214 may be a FIFO (First-In First-Out) type memory.

The base station apparatus 200 according to this embodiment includes a timer 224. The timer 224 is used to determine updating timing. The timer 224 may be provided outside or inside the base station apparatus 200.

An operation of the base station apparatus 200 according to this embodiment is described.

The operation of the base station apparatus 200 according to this embodiment mainly includes an operation of determining distribution information at transmission timing. Also, the operation of the base station apparatus 200 includes an operation of updating a counter value at reception of a distribution request for control information from the terminal apparatus 100. Furthermore, the operation of the base station apparatus 200 may include an operation of updating a counter weight coefficient at reception of a transmission request for the control information from the terminal apparatus 200. Also, the operation of the base station apparatus 200 includes an operation of changing the distribution method of the control information within an area in charge upon passage of a certain time period.

Figure 4:
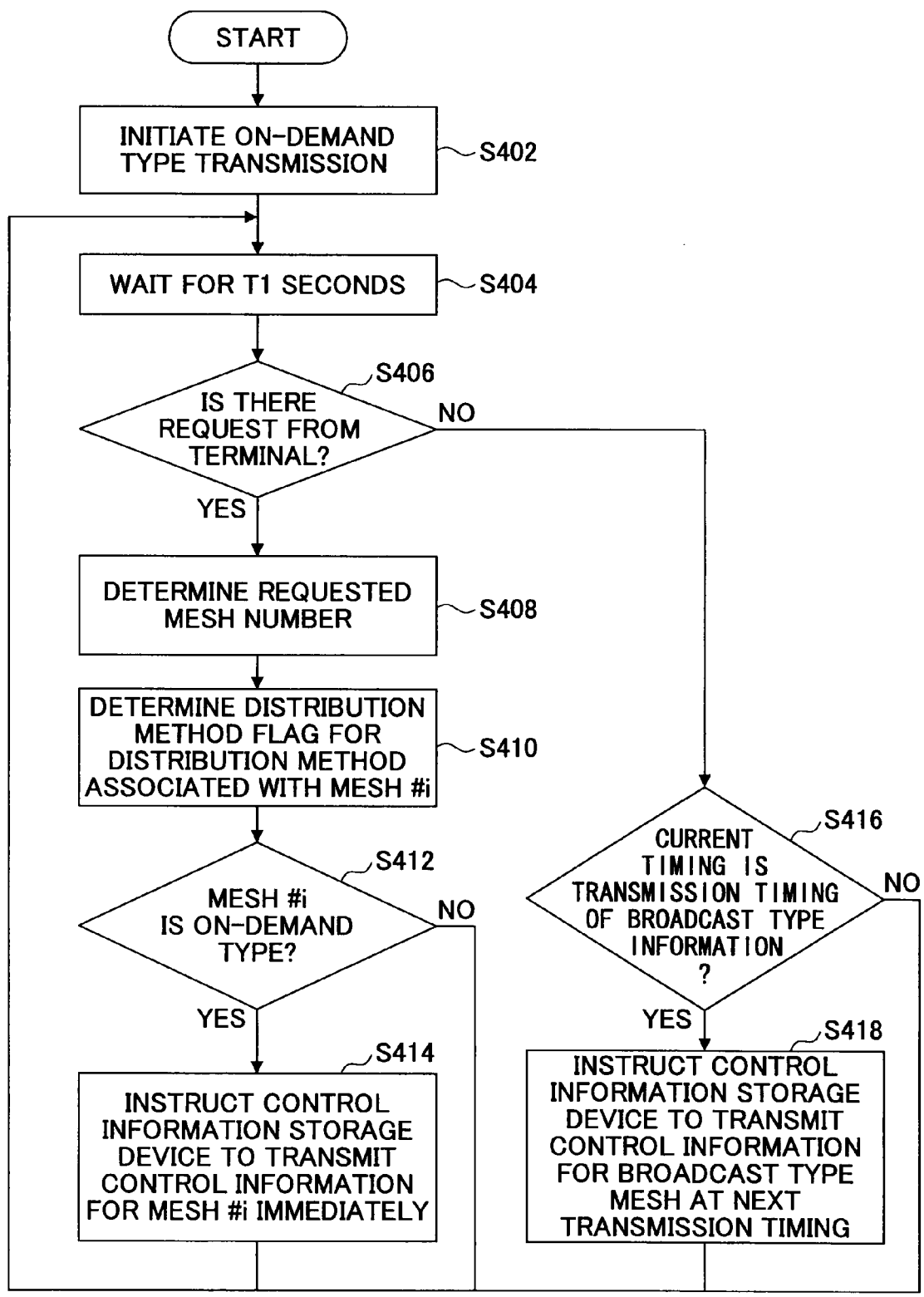
FIG. 4 is a flow diagram illustrating an operation of a base station apparatus according to one embodiment.

The determination operation of the distribution information at transmission timing is described with reference to FIG. 4. This operation is mainly conducted in the distribution information determination unit 206.

At initiation time of distribution of control information, in response to all requests for meshes from terminal apparatuses in accordance with the on-demand type distribution method, the base station apparatus 200 distributes the control information (step S402). For example, the distribution information determination unit 206 determines to distribute the control information in accordance with the on-demand type distribution method.

The base station apparatus 200 waits for T1 seconds (step S404).

The base station apparatus 200 determines that the terminal apparatus 100 has made a transmission request for the control information (step S406). For example, the distribution information determination unit 206 determines whether the base station apparatus 200 has received the control information transmission request from the terminal apparatus 100 for the T1 seconds. For example, the control information transmission request transmitted from the terminal apparatus 100 is received at the transmission request receiving unit 208. Receiving the control information transmission request, the transmission request receiving unit 208 supplies the control information transmission request to the distribution information determination unit 206.

If the control information transmission request is issued from the terminal apparatus 100 (step S406:YES), the base station apparatus 200 checks the requested mesh number (step S408). For example, the distribution information determination unit 206 serves to determine the mesh number requested by the terminal apparatus 100 transmitting the control information transmission request. For example, the distribution information determination unit 206 may determine the mesh number included in the control information transmission request.

The base station apparatus 200 determines a distribution method of the control information corresponding to the mesh number requested by the terminal apparatus at step S408 (step S410). For example, the distribution information determination unit 206 serves to determine the distribution method of the control information corresponding to the mesh number determined at step S408 with reference to the distribution method flag 216.

The base station apparatus 200 determines whether the distribution method determined at step S410 is the on-demand type distribution method (step S412). For example, the distribution information determination unit 206 serves to determine whether the distribution method determined at step S410 is the on-demand type distribution method.

If the distribution method is the on-demand type distribution method (step S412:YES), the base station apparatus 200 distributes the control information associated with the mesh (step S414). For example, the distribution information determination unit 206 may instruct the control information storage device 202 to supply the control information corresponding to the mesh to the control channel transmitting unit 204. As a result, the control information corresponding to the mesh can be distributed via the control channel transmitting unit 204. On the other hand, if the distribution method is not the on-demand type distribution method (step S412:NO), the flow returns to step 5404. The base station apparatus 200 waits for T1 seconds.

Also, if it is determined that no control information transmission request is not issued from the terminal apparatus (step S406: NO), the base station apparatus 100 determines whether the current timing corresponds to transmission timing of the broadcast type information (step S416). For example, the distribution information determination unit 206 serves to determine whether the current timing corresponds to the transmission timing of the broadcast type information.

If the current timing corresponds to the transmission timing of the broadcast type information (step S416: YES), the base station apparatus 200 distributes the control information to the broadcast type distribution method applied mesh at the next transmission timing (step S418). For example, the distribution information determination unit 206 may instruct the control information storage device 202 to supply the control information corresponding to the broadcast type distribution method applied mesh to the control channel transmitting unit 204 at the next transmission timing. In other words, the distribution is deferred until the next transmission timing in the broadcast type distribution method comes. As a result, the control information corresponding to the mesh is distributed via the control channel transmitting unit 204. On the other hand, if the current timing does not correspond to the transmission timing of the broadcast type information (step S416: NO), the flow returns to step S404. The base station apparatus 200 waits for T1 seconds.

If the terminal apparatus 100 suddenly needs the control information and transmits a control information transmission request, the base station apparatus 200 conducts an operation as follows. If the on-demand type distribution method is applied to the relevant mesh, in response to the control information transmission request, the base station apparatus 200 distributes the control information. On the other hand, if the on-demand type distribution method is not applied to the relevant mesh, in response to the control information transmission request, the base station apparatus 200 does not distribute the control information. In this case, the base station apparatus 200 instead distributes the control information periodically in accordance with the broadcast type distribution method. In this manner, the number of distribution times of distributing the control information for the mesh in accordance with the broadcast type distribution method can be reduced. As a result, it is possible to improve frequency utilization efficiency.

Figure 5:
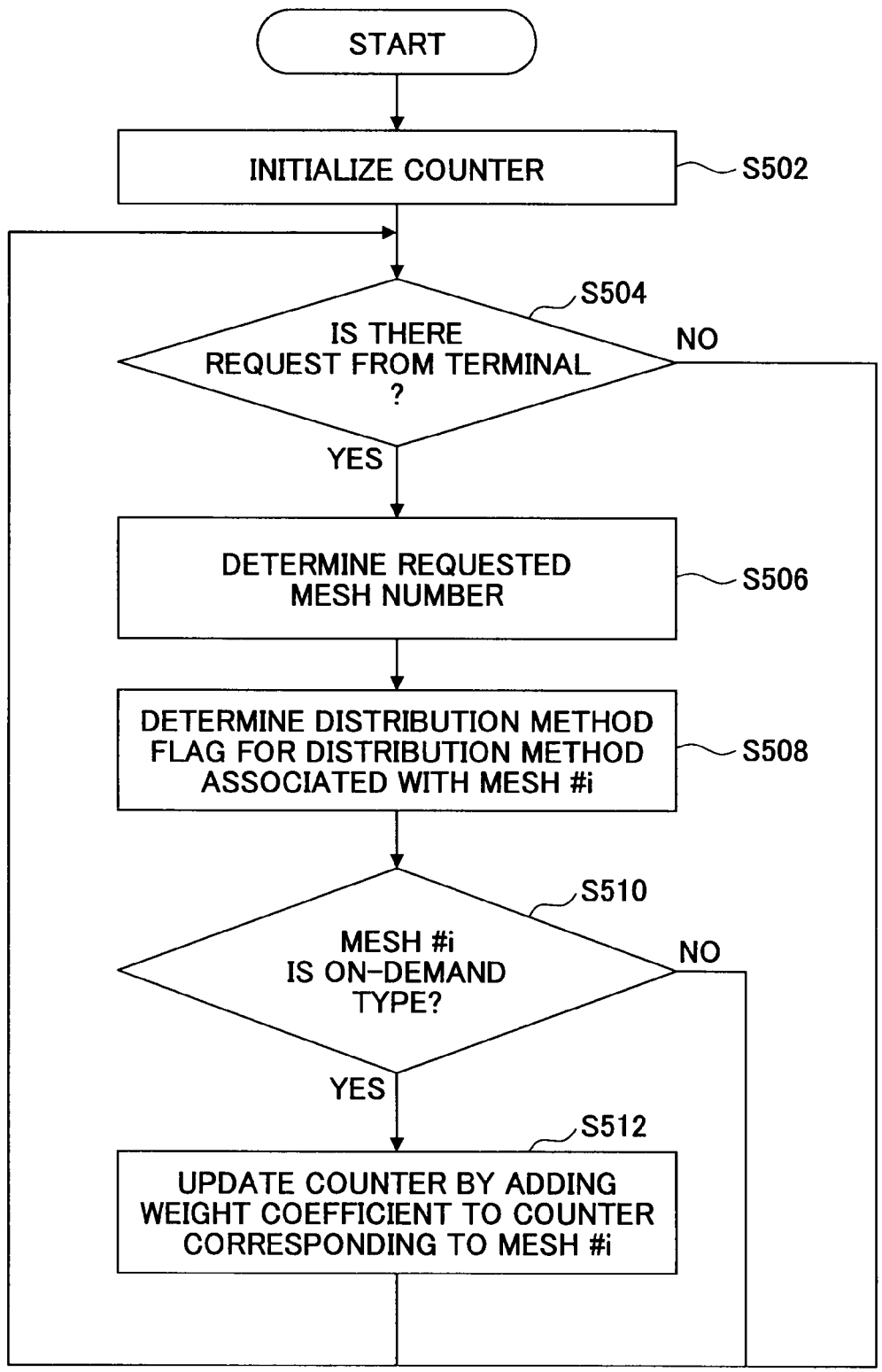
FIG. 5 is a flow diagram illustrating an operation of a base station apparatus according to one embodiment.

The operation of updating a counter value in response to receipt of a control information transmission request from the terminal apparatus 100 is described with reference to FIG. 5. This operation is conducted in the counter updating unit 210.

The base station apparatus 200 initializes a counter (step S502).

The base station apparatus 200 determines whether a control information transmission request is issued from the terminal apparatus 100 (step S504). For example, when the transmission request receiving unit 208 receives the control information transmission request from the terminal apparatus 100, the transmission request receiving unit 208 supplies the received control information transmission request to the counter updating unit 210. Upon receiving the control information transmission request from the transmission request receiving unit 208, the counter updating unit 210 determines whether the control information transmission request transmitted from the terminal apparatus 100 has been received.

If the transmission request for the control information is issued from the terminal apparatus 100 (step S504: YES), the base station apparatus 200 determines the requested mesh number (step S506). For example, the counter updating unit 210 determines the mesh number requested by the terminal apparatus 100 transmitting the control information transmission request. For example, the counter updating unit 210 may find the mesh number included in the control information transmission request.

Figure 6:
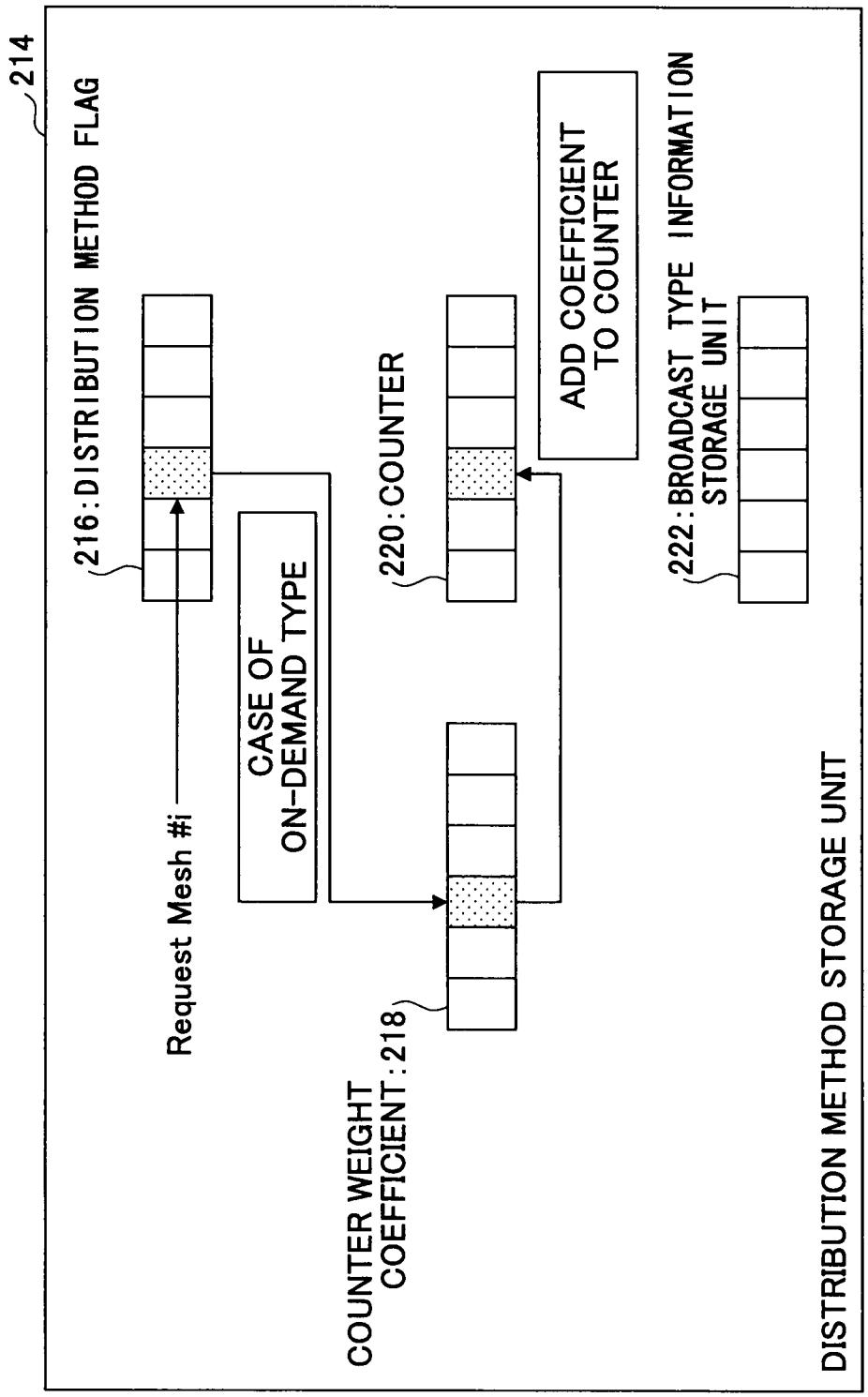
FIG. 6 is a schematic view illustrating an operation of a base station apparatus according to one embodiment.

The base station apparatus 200 finds a distribution method of the control information for the mesh corresponding to the mesh number determined at step S506 (step S508). For example, as illustrated in FIG. 6, the counter updating unit 210 may determine the distribution method of the control information for the mesh corresponding to the mesh number determined at step S506 with reference to the distribution method flag 216. The distribution method flag 216 indicates the control information distribution method corresponding to each mesh. For example, the flag may be set for the mesh to which the on-demand type distribution method is applied.

The base station apparatus 200 determines whether the distribution method determined at step S508 corresponds to the on-demand type distribution method (step S510). For example, the counter updating unit 210 may determine whether the distribution method determined at step S508 corresponds to the on-demand type distribution method.

If the distribution method is the on-demand type distribution method (step S510: YES), the base station apparatus 200 adds a weight coefficient to the counter corresponding to the mesh for updating (step S512). For example, as illustrated in FIG. 6, the counter updating unit 210 may extract the weight coefficient corresponding to the mesh from the counter weight coefficient 218. Then, as illustrated in FIG. 6, the counter updating unit 210 may add the extracted weight coefficient to one of counter values in the counter 220 corresponding to the mesh for updating. At this time, the counter updating unit 210 may count the counter value without addition of the weight coefficient.

On the other hand, in the cases where the control information transmission request is not transmitted from the terminal apparatus 100 at step S504 (step S504: NO) and the distribution method is not the on-demand type distribution method at step S510 (step S510: NO), the flow returns to step S504.

In this manner, in the case where the on-demand type distribution method is applied to the mesh corresponding to the control information transmission request transmitted from the terminal apparatus 100, the counter 220 is updated. As a result, it is possible to prevent the broadcast type distribution method from being always adopted for the same mesh when the distribution method is updated. For example, this may be useful to address some problems such as drastic increase and decrease in control information transmission requests that may arise upon movement of a large number of terminals due to train operation.

Figure 7:
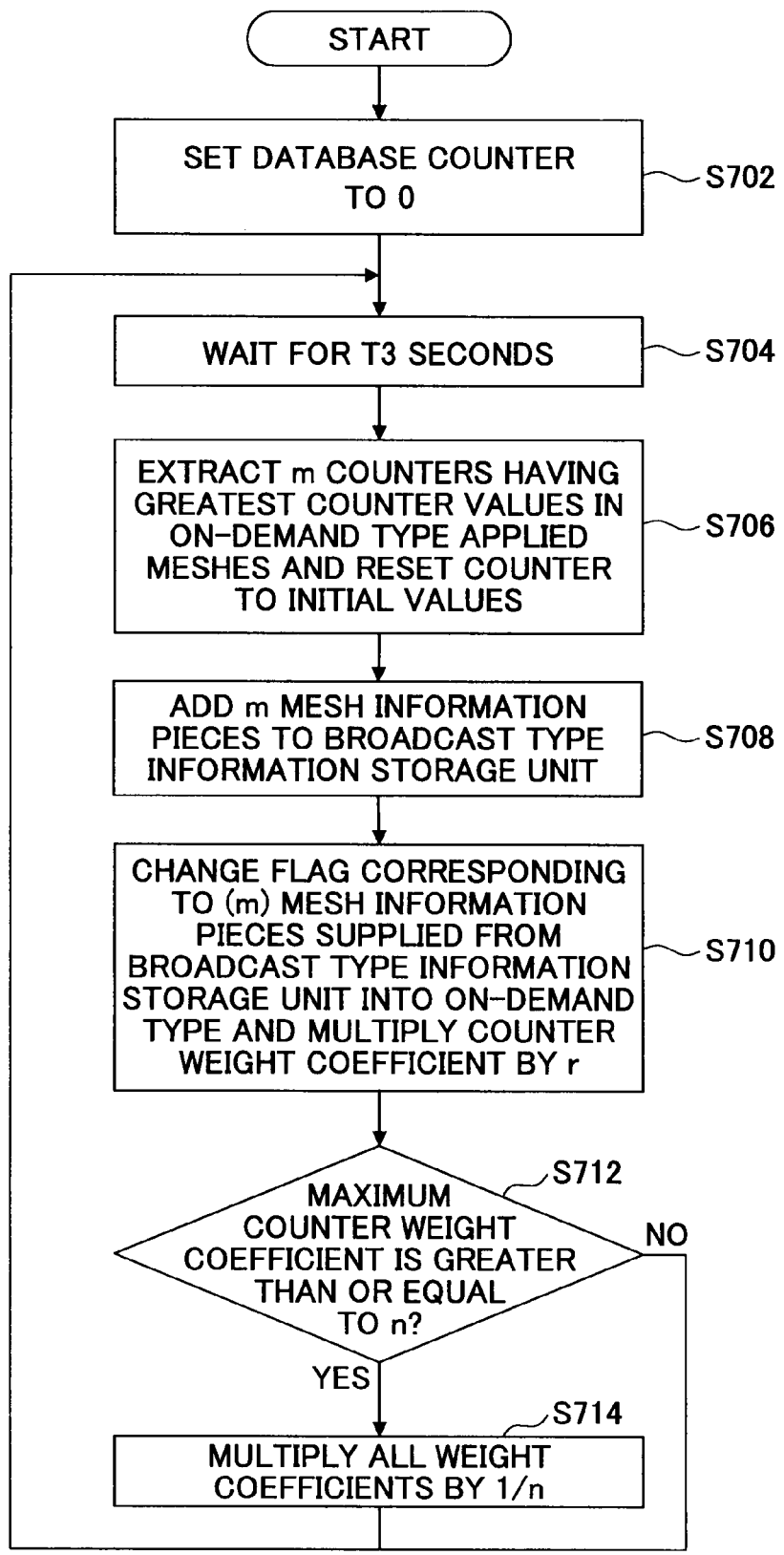
FIG. 7 is a flow diagram illustrating an operation of a base station apparatus according to one embodiment.
Figure 8:
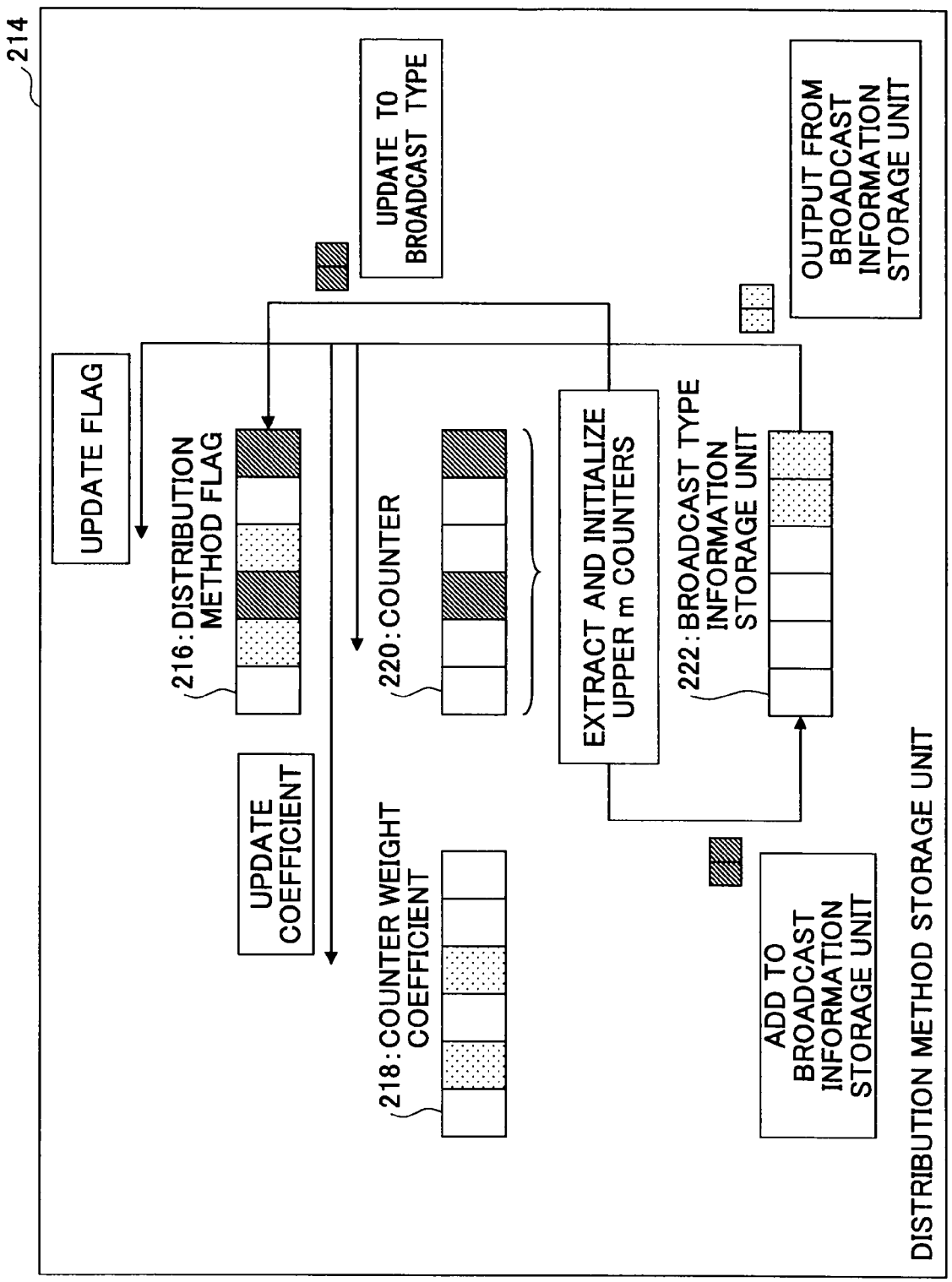
FIG. 8 is a schematic view illustrating an operation of a base station apparatus according to one embodiment.

The operation of changing the distribution method for control information within an area in charge upon passage of a certain time period is described with reference to FIG. 7. This operation is mainly conducted in the distribution method updating unit 212.

When the distribution method is changed, the distribution method updating unit 212 changes parameters stored in the distribution method storage unit 214. In this embodiment, as one example, it is assumed that the distribution method is changed every T3 seconds. Also in this embodiment, as one example, it is assumed that the distribution methods for m meshes are changed at one time, the maximum value of the counter weight coefficient is set to n, and a multiplier coefficient for updating the counter weight coefficient is set to r.

The base station apparatus 200 sets a database counter to 0 (step S702). For example, the distribution method updating unit 212 sets a counter value of the counter 220 in the distribution method storage unit 214 to 0.

The base station apparatus 200 waits for T3 seconds (step S704).

Among on-demand type distribution method applied meshes, the base station apparatus 200 extracts m meshes having upper counter values. Then, the base station apparatus 200 initializes the database counter to an initial value (step S706). For example, the distribution method updating unit 212 extracts m counters having upper counter values with reference to the counter 220. Then, the distribution method updating unit 212 resets the counter values in the counter 220 to initial values. Here, all counter values or the extracted m counter values in the counter 220 may be reset to the initial values.

The base station apparatus 200 stores control information for the meshes extracted at step S706 in the broadcast type information storage unit 222 (step S708).

The base station apparatus 200 distributes the control information at a control information distribution cycle in accordance with the broadcast type distribution method. Then, the base station apparatus 200 changes the distribution method flag 216 corresponding to meshes, where the control information is distributed, into the on-demand type distribution method. The base station apparatus 200 multiplies r by the counter weight coefficients of the meshes extracted at step S706 from meshes included in the counter weight coefficient 218. In this manner, a higher probability of changing the meshes from the on-demand type distribution method into the broadcast type distribution method at the next time can be achieved. For example, the distribution method updating unit 212 changes the distribution method of the extracted meshes into the on-demand type distribution method for the distribution method flag 216. Then, the distribution method updating unit 212 multiplies r by the counter weight coefficients corresponding to the extracted meshes.

The base station apparatus 200 determines whether the maximum value of the counter weight coefficients is greater than or equal to n (step S712). For example, the distribution method updating unit 212 may determine whether there is a mesh having the counter weight coefficient greater than or equal to n with reference to the counter weight coefficient

218. The parameter n may be determined depending on the capacity of the counter weight coefficient 218.

If there is a mesh having the counter weight coefficients greater than or equal to n (step S712: YES), the base station apparatus 200 multiplies 1/n by the weight coefficient in the counter weight coefficient 218 (step S714). For example, the distribution method updating unit 212 may multiply 1/n by the weight coefficients corresponding to meshes in the counter weight coefficient 218. In this manner, standardization can be periodically made at the maximum value of the weight coefficients such that it cannot exceed the capacity of the counter weight coefficient 218 for storing the weight coefficients. On the other hand, if all the weight coefficients are smaller than n (step S712: NO), the flow returns to step S704.

Here, the period T3 for updating the distribution method can be modified as needed. The adjustment of T3 makes it possible to respond to temporal variations of the corresponding traffic. For example, for a sufficiently large T3 value, it can respond to the temporal traffic variations between weekdays and weekends or between daytime and nighttime. Also, for a sufficiently small T3 value, it can respond to drastic increase and decrease in control signal requests due to movements of a large number of terminal apparatuses involved in train operation.

Alternatively, multiple different periods T3 for updating the distribution method may be used. Also, different m values of distribution methods changed at one time may be used. Also, multiple different r values of multiplier coefficients for updating the counter weight coefficient may be used. In this manner, it can respond to multiple temporal traffic variations.

According to this embodiment, the base station apparatus can segments an area in charge into multiple areas and adopt either the broadcast type distribution method or the on-demand type distribution method within the segmented areas. The segmented areas may be referred to as meshes. Determination of the distribution method on a per-mesh basis can improve frequency utilization efficiency within the area in charge of the base station apparatus. Also, the availability of the two types of distribution methods, the broadcast type distribution method and the on-demand type distribution method, can reduce delay in the distribution.

According to this embodiment, the base station apparatus adopts the on-demand type distribution method as initial state. Then, the base station apparatus switches to the broadcast type distribution method for a mesh requested by a terminal apparatus within the area in charge many times. In this manner, the frequency utilization efficiency can be enhanced by distributing control signals periodically to the mesh requested by the terminal apparatus many time.

By adopting the number of request times from the terminal apparatus as a parameter for determining the distribution method switch, meshes being more likely to need control information can be estimated. Then, the broadcast type distribution method is adopted in distribution for the meshes being more likely to need the control information. In this manner, the frequency utilization efficiency can be improved. Also, it is possible to switch to the on-demand type distribution method for the broadcast type distribution method applied meshes after passage of a certain time period. By switching from the broadcast type distribution method to the on-demand type distribution method, it is possible to respond to temporal variations of user positional distributions and traffic amounts.

Also, according to this embodiment, in the switch from the on-demand type distribution method to the broadcast type distribution method, the number of previous switch times may be used as a parameter. In addition, in the switch from the on-demand type distribution method to the broadcast type distribution method, urgency of a change reason of the control information may be used as a parameter. The frequent switch between the broadcast type distribution method and the on-demand type distribution method can be avoided for the meshes requested by the terminal apparatus many times by using the number of previous switch times as the weight coefficient. In addition, by using the emergency of the control information change reason as the parameter, when the control information is changed to distribute emergency information in a radio system that can distribute the emergency information such as disaster information, the modification of the distribution method can be transmitted emergently.

For convenience, the present invention has been described with reference to several separate embodiments, but the separation into the embodiments is not essential to the present invention. Two or more of the embodiments may be used as needed. Although specific numerical instances are used in the description in order to facilitate understandings of the present invention, unless specifically stated otherwise, these numerical instances are simply illustrative, and any appropriate value may be used.

The present invention has been described with reference to the specific embodiments, but the embodiments are simply illustrative, and those skilled in the art will understand various variations, modifications, alterations and substitutions. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2008-131375 filed on May 19, 2008, the entire contents of which are hereby incorporated by reference.

LIST OF REFERENCE SYMBOLS

100: terminal apparatus
200 (200$_1$, 200$_2$): base station apparatus
202: control information storage device
204: control channel transmitting unit
206: distribution information determination unit
208: transmission request receiving unit
210: counter updating unit
212: distribution method updating unit
214: distribution method storage unit
216: distribution method flag
218: counter coefficient
220: counter
222: broadcast information storage unit
224: timer

The invention claimed is:

1. A base station apparatus, comprising:
   a distribution unit configured to distribute control information on a per-segmented area basis, the segmented area resulting from segmentation of a coverage area into multiple segmented areas;
   a storage unit configured to store the control information corresponding to the segmented areas;
   a determination unit configured to determine as a distribution method for the segmented areas one of a first distribution method of periodically distributing the control information corresponding to the segmented areas in the coverage area and a second distribution method of distributing the control information corresponding to one of the segmented areas requested by a terminal apparatus in response to a request by the terminal apparatus; and a counting unit configured to count a number of requests for the control information from the terminal apparatus in response to a control information request signal received when the control information corresponding to said segmented area is requested by the terminal apparatus, wherein the determination unit determines whether to distribute the control information in accordance with the first distribution method of periodically distributing the control information based on the number of requests, and if the control information request signal received when the control information corresponding to said segmented area is requested by the terminal apparatus is not received, the determination unit determines to distribute the control information in accordance with the first distribution method of periodically distributing the control information, and the counting unit applies a weight coefficient corresponding to the number of requests.

2. The base station apparatus as claimed in claim 1, wherein if the determination unit determines the distribution method of distributing the control information corresponding to said segmented area requested by the terminal apparatus as the second distribution method in said segmented area for which the control information is requested through the control information request signal, the determination unit determines to distribute the control information corresponding to said segmented area requested by the terminal apparatus transmitting the control information request signal.

3. The base station apparatus as claimed in claim 1, wherein the determination unit changes to the second distribution method of distributing the control information corresponding to said segmented area requested by the terminal apparatus after distributing the control information in accordance with the first distribution method of periodically distributing the control information.

4. The base station apparatus as claimed in claim 1, wherein the determination unit determines to distribute the control information in accordance with the first distribution method of periodically distributing the control information based on a number of previous switches regarding the distribution methods.

5. The base station apparatus as claimed in claim 1, wherein the determination unit determines to distribute the control information in accordance with the first distribution method of periodically distributing the control information based on emergency of a change reason of the control information.

6. A method in a base station apparatus for distributing control information on a per-segmented area basis wherein the segmented area results from segmentation of a coverage area into multiple segmented areas, comprising:

determining as a distribution method for the segmented areas one of a first distribution method of periodically distributing the control information corresponding to the segmented areas in the coverage area and a second distribution method of distributing the control information corresponding to one of the segmented areas requested by a terminal apparatus in response to a request by the terminal apparatus;

distributing the control information on the per-segmented area basis in accordance with the distribution method determined by said determining; and counting a number of requests for the control information from the terminal apparatus in response to a control information request signal received when the control information corresponding to said segmented area is requested by the terminal apparatus, wherein said determining includes determining whether to distribute the control information in accordance with the first distribution method of periodically distributing the control information based on the number of requests, and if the control information request signal received when the control information corresponding to said segmented area is requested by the terminal apparatus is not received, said determining determines to distribute the control information in accordance with the first distribution method of periodically distributing the control information, and the counting includes applying a weight coefficient corresponding to the number of requests.

* * * * *